US006857310B2

(12) United States Patent
Bergerhoff et al.

(10) Patent No.: US 6,857,310 B2
(45) Date of Patent: *Feb. 22, 2005

(54) METHOD AND SYSTEM FOR DETERMINING WHEEL POSITION

(75) Inventors: Nikolas Bergerhoff, Regensburg (DE); Martin Fischer, Regensberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/279,420

(22) Filed: Oct. 24, 2002

(65) Prior Publication Data

US 2003/0076234 A1 Apr. 24, 2003

(51) Int. Cl.$^7$ ............................................. G01M 17/02
(52) U.S. Cl. ........................ 73/146; 73/146.2; 73/146.3
(58) Field of Search ............................ 73/146, 146.2, 73/146.3, 146.5, 146.8; 340/442, 444, 44 Y

(56) References Cited

U.S. PATENT DOCUMENTS 6,435,020 B1 * 8/2002 Oldenettel et al. ......... 73/146.4
6,476,712 B1 * 11/2002 Achterholt .................. 340/447
6,518,876 B1 * 2/2003 Marguet et al. ............. 340/447
2003/0197603 A1 * 10/2003 Stewart et al. .............. 340/442

FOREIGN PATENT DOCUMENTS

| DE | 197 20 123 C2 | 3/2001 | ........... H02J/13/00 |
| DE | 100 14 076 A1 | 10/2001 | ........... B60C/23/02 |
| EP | 0 806 370 B1 | 4/1997 | ........... B65D/43/10 |

* cited by examiner

Primary Examiner—Edward Lefkowitz
Assistant Examiner—Andre Allen
(74) Attorney, Agent, or Firm—Baker Botts L.L.P.

(57) ABSTRACT

A method for determining the wheel position (FL, FR, RL, RR) of wheels (R1, R2, R3, R4) of a motor vehicle (10) which, for monitoring purposes, in particular for monitoring the tire pressures, are each assigned a wheel unit (E1, E2, E3, E4) which transmits data (D1, D2, D3, D4) to a central evaluation device (ECU) of the vehicle (10), at least in response to a trigger signal (TR1, TR2, TR3, TR4, TR5, TR6). The wheel positions (FL, FR, RL, RR) of the monitored wheels (R1, R2, R3, R4) can be determined by activating a portable transmitter (12) whose position with respect to the vehicle (10) is sensed.

19 Claims, 2 Drawing Sheets

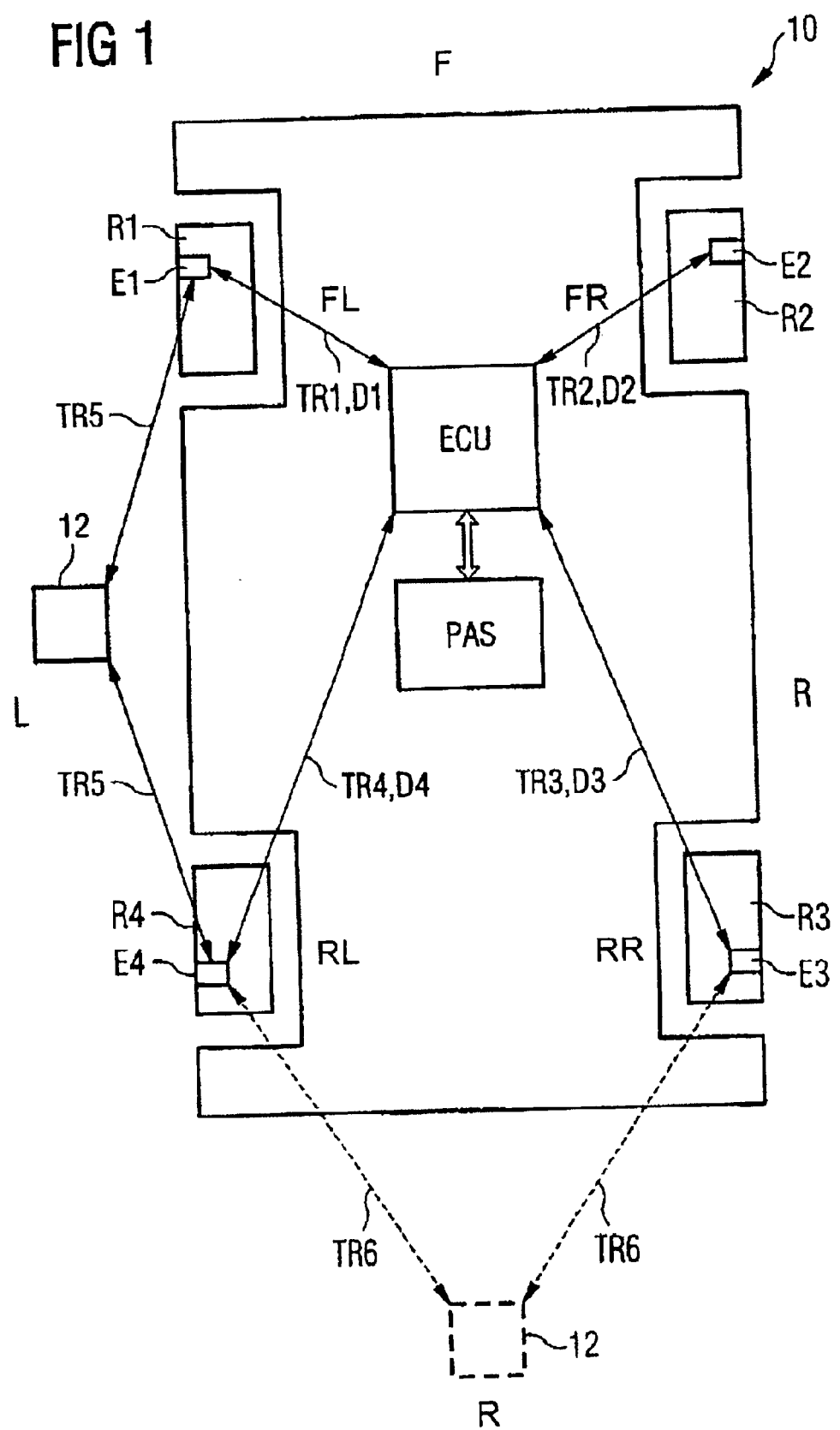

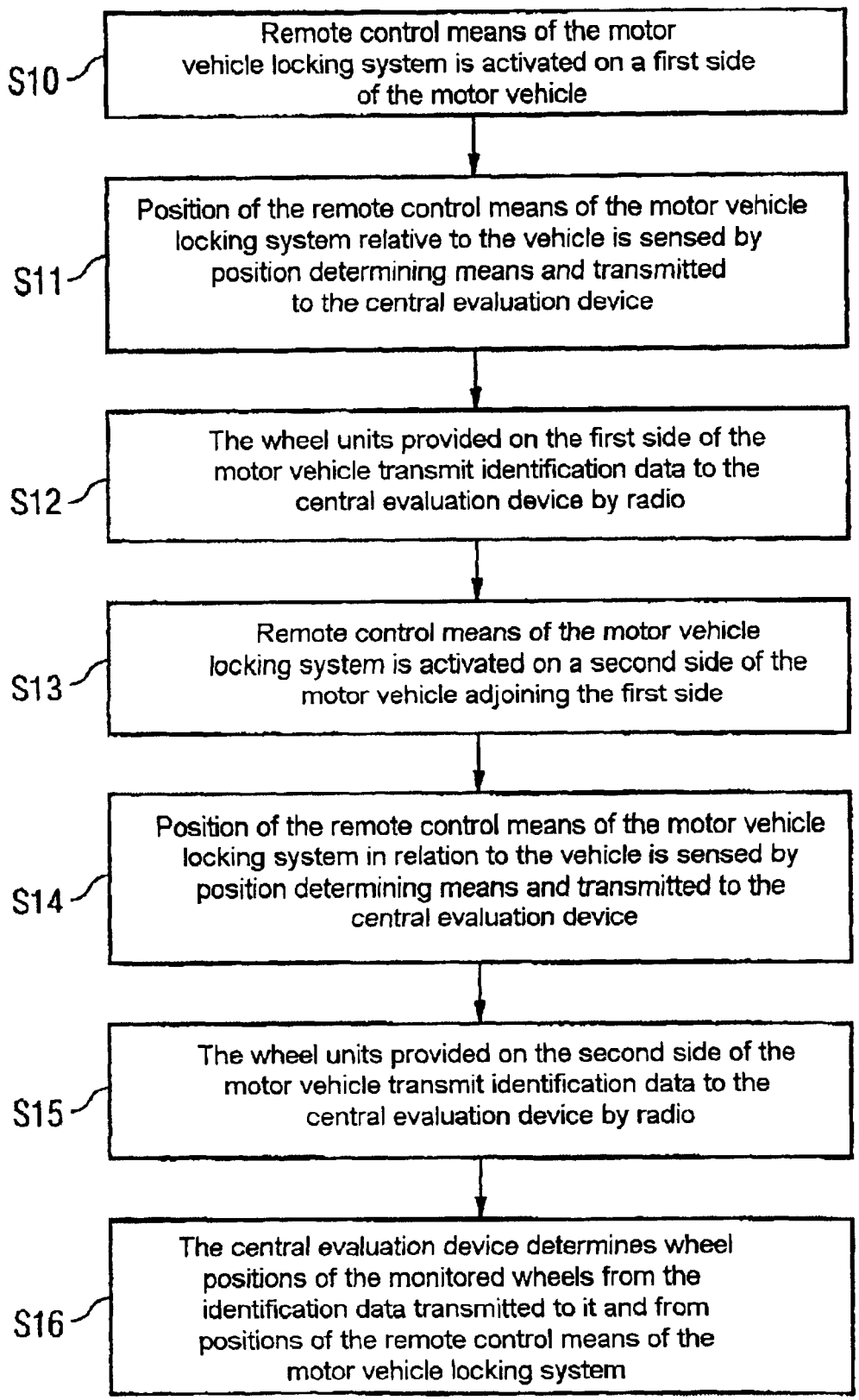

US 6,857,310 B2

METHOD AND SYSTEM FOR DETERMINING WHEEL POSITION

RELATED APPLICATIONS

This application claims priority to German Application No. DE10152337.8 filed Oct. 24, 2001.

BACKGROUND OF THE INVENTION

The invention relates to a method and a system for determining the wheel position of wheels of a motor vehicle which, for monitoring purposes, in particular for monitoring the tire pressures, are each assigned a wheel unit which transmits data to a central evaluation device of the vehicle, at least in response to a trigger signal.

In conjunction with the systems and the methods of the generic type it is known, for example, that the wheel units transmit information, by means of radio-frequency signals, to a central evaluation device which is arranged on the chassis of the motor vehicle. Wheel unit in the present context is to be understood as any unit which rotates together with a respective wheel and is suitable for supplying information or data which can be used to detect the fault states possibly occurring at the wheel.

The term fault state is to be understood widely in the present context and comprises all states which are considered worthy of detection.

In addition to the actual detection of a fault state, in many systems and methods of the generic type there is provision for the wheel position (for example front left, front right, rear left, rear right) of the individual wheels to be determined so that when a fault state occurs the fault state can be indicated together with the respective wheel position.

For example, EP 0 806 307 B1 has already disclosed a method for carrying out the assignment of the wheel position to air pressure monitoring devices in an air pressure monitoring system of a motor vehicle, the motor vehicle having, inter alia, the following components: a number of wheels, each wheel being assigned an air pressure monitoring device which is capable of transmitting an individual identifier to a central unit, and a central unit in which the assignment of the identifier of an air pressure monitoring device to the wheel position for each wheel is stored. In the method known from EP 0 806 307 B1, the assignment of the air pressure monitoring device to the wheel positions is performed as follows: an assignment mode is switched on; the individual identifiers of the air pressure monitoring device are emitted; which specific identifier has been transmitted from which wheel position is evaluated in the central unit; the determined assignment in the central unit is stored; and the assignment mode is switched off and the air pressure monitoring system is operated in a pressure monitoring mode. In order to evaluate the individual identifiers, there is in particular provision here for a specific variable, for example the wheel speed, to be measured for each wheel of the motor vehicle both with a wheel unit of the pressure monitoring device and with a fixed sensor with a known wheel position. Then, the wheel position of the individual wheels is determined by comparing the output signals of the fixed sensors and the output signals of the wheel units.

DE 197 20 123 C2 has also disclosed that a separate antenna is provided in the region of each wheel to be monitored, it being possible to use said antennas to receive signals emitted by the wheel units. Although each of the antennas can, under certain circumstances, also receive signals of wheel units which are not arranged directly adjacent to the respective antenna, according to the teaching of DE 197 20 123 C2, in order to determine the wheel positions of the individual wheels it is sufficient to assume that a signal which is emitted by a directly adjacent wheel unit and is received has a higher signal level than a signal which is received by the wheel unit which is arranged further away.

The known systems and methods have in common the fact that they are very costly and therefore expensive in terms of the necessary hardware and software.

SUMMARY OF THE INVENTION

The invention is based on the object of developing the methods and systems of the generic type in such a way that those wheels of a motor vehicle which have wheel units can easily be assigned to the individual wheel positions.

This object is achieved a method for determining the wheel position of wheels of a motor vehicle in which, for monitoring purposes, are each assigned a wheel unit which transmits data to a central evaluation device of the vehicle, at least in response to a trigger signal, wherein the wheel positions of the monitored wheels are determined by activating a portable transmitter and by sensing its position with respect to the vehicle by means of position determining means.

The trigger signal can be fed to at least one wheel unit by activating the portable transmitter. The portable transmitter can be formed by a component of a vehicle locking system. The position of the portable transmitter with respect to the vehicle can be sensed by evaluating the output signals of components of a vehicle locking system which are provided at the vehicle end. Determination of the wheel positions of the monitored wheels may comprise the portable transmitter being activated from at least two different sides with respect to the vehicle. The activation of the portable transmitter from a first side with respect to the vehicle may cause a trigger signal to be fed to the two wheel units which face the first side. The data which is transmitted to the central evaluation device in response to a trigger signal comprises identification data of the wheel unit. The method may be carried out after a fault state has been determined from data which has been transmitted to the central evaluation device by one or more wheel units. The method may monitor the tire pressure.

An embodiment according to the present invention is a system for determining the wheel position of wheels of a motor vehicle, which, for monitoring purposes, are each assigned a wheel unit which transmit data to a central evaluation device of the vehicle at least in response to a trigger signal, wherein it has a portable transmitter whose activation triggers the determination of the wheel positions of the monitored wheels and has position determining means which determine the position of the portable transmitter with respect to the vehicle.

A trigger signal can be fed to at least one wheel unit as a result of the activation of the portable transmitter. The portable transmitter may be formed by a component of a vehicle locking system. The position determining means can evaluate the output signals of components of a vehicle locking system which are provided at the vehicle end. The determination of the wheel positions of the monitored wheels may comprise the portable transmitter being activated from at least two different sides with respect to the vehicle. The activation of the portable transmitter from a first side, with respect to the vehicle can cause a trigger signal to be fed to the two wheel units which face the first side. Data which is transmitted to the central evaluation device in response to a trigger signal can comprise identification data of the wheel unit. The system can determine at least the wheel position of the wheel at which a fault state has occurred after a fault state has been determined from data which has been transmitted to the central evaluation device by one or more wheel units and the system may monitor the tire pressure.

The method according to the invention is based on the prior art of the generic type in that the wheel positions of the monitored wheels are determined by activating a portable transmitter whose position in respect of the vehicle is sensed. The portable transmitter is preferably a transmitter which emits radio-frequency signals. The wheel positions of the monitored wheels are preferably determined for all the wheels in such a way that, for example, an individual wheel identifier can be stored together with the associated wheel position. Furthermore, the wheel positions are preferably determined at least when one or more wheels have been changed.

In the method according to the invention there is preferably also provision that a trigger signal is fed to at least one wheel unit by activating the portable transmitter. The trigger signal which is fed to the wheel unit in this context can, if appropriate, differ from the trigger signals which during operation request the wheel units to transmit the current data to the central evaluation device.

In one particularly preferred embodiment of the method according to the invention there is provision for the portable transmitter to be a component of a vehicle locking system. Here, the component of the vehicle locking system may be, for example, [lacuna] by a remote control means which is to be activated manually or the portable transmitter, embodied for example as a chip card, of what is referred to as a keyless go system. The remote control means can feed a trigger signal to, for example, one or more wheel units if a push button key, provided for unlocking or locking the motor vehicle, of the remote control means is activated. However, it is also possible for the remote control means to feed a trigger signal to one or more wheel units only if a specific push button key of the remote control means or a specific push button key combination is pressed. The portable transmitter of a keyless go system can, for example, feed a trigger signal to one or more wheel units after it has received a request signal from components of the keyless go system which are provided at the vehicle end. The use of a component of the vehicle locking system as a portable transmitter whose activation brings about the determination of the wheel positions is advantageous because in this case the user does not need to carry or keep ready any additional components on his person.

In particular, in the context explained above, the method according to the invention preferably also provides for the position of the portable transmitter with respect to the vehicle to be sensed by evaluating the output signals of components of a vehicle locking system which are provided at the vehicle end. In particular, in vehicle locking systems which operate with remote control means, the components which are provided at the vehicle end can be formed, for example, by receivers which are arranged in a known fashion in the region of the door handles and of the lid of the trunk. Of course, it is additionally or alternatively possible to provide for one or more receivers to be arranged in the front region of the motor vehicle. The receivers of the motor vehicle locking system are suitably connected to the control unit of the vehicle locking system. If the position of the portable transmitter is not sensed or determined by the control unit of the vehicle locking system, the receivers of the vehicle locking system can also, if appropriate, be connected to further devices which are suitable for determining the position of the portable transmitter. In the case of keyless go systems, the side of the vehicle on which the portable transmitter to be activated is located is, for example, determined at the vehicle end in that a corresponding request signal is successively emitted in different directions by vehicle-end components of the system. The portable transmitter responds only if the request signal transmits in the direction in which the portable transmitter is located at that particular time.

In one particularly preferred embodiment of the method according to the invention there is provision for the determination of the wheel positions of the monitored wheels to comprise the portable transmitter being activated from at least two different sides with respect to the vehicle. Here, it is particularly preferred if two adjacent sides are used, for example left and rear or right and front.

In particular in this context, there is also provision in the method according to the invention for the activation of the portable transmitter from a first side with respect to the vehicle to cause a trigger signal to be fed to the two wheel units which face the first side. If the portable transmitter is, for example, firstly activated behind the motor vehicle, the wheel units which are provided rear left and rear right transmit data to the central evaluation device in response, this data being preferably stored in the central evaluation device. If the portable transmitter is then activated from the left with respect to the vehicle, the wheel units which are provided front left and rear left transmit their data to the central evaluation device. The latter can then assign the correct wheel position to all the wheels of the motor vehicle in the knowledge that the transmitter has been activated from the rear and from the left and on the basis of the fact that the wheel unit which is provided rear left has transmitted data twice.

In this context, there is preferably also provision for the data which is transmitted to the central evaluation device in response to a trigger signal to comprise identification data of the wheel unit. In particular if the trigger signal which is emitted by the portable transmitter differs from the trigger signals which have been emitted by the central evaluation device in order to request data from the wheel units, it may be sufficient if, in order to determine the position, the wheel units merely transmit their identifier to the central evaluation device. This identifier is preferably also a component of the data which is transmitted to the central evaluation device in order to permit fault states to be detected.

In certain embodiments of the method according to the invention it is possible to provide for the method to be carried out after a fault state has been determined from data which has been transmitted to the central evaluation device by one or more wheel units. Such embodiments are considered in particular if the wheel position of the individual wheels is not stored permanently. In this case it is possible for the driver to activate the portable transmitter when the vehicle is stationary only if the presence of a fault state has already been indicated to him but without a corresponding wheel position. The indication of the wheel position of the wheel at which a fault state has occurred takes place subsequently in this case.

Any system which is suitable for carrying out an embodiment of the method according to the invention falls within the scope of protection of the associated claims.

The system according to the invention builds on the prior art of the generic type in that it has a portable transmitter whose activation triggers the determination of the wheel positions of the monitored wheels, and has position determining means which determine the position of the portable transmitter with respect to the vehicle. As a result, the advantages explained with respect to the method according to the invention are obtained in an identical or similar way, for which reason reference is made to the corresponding statements in order to avoid repetitions.

The same applies correspondingly for the following preferred embodiments of the device according to the invention, reference also being made to the corresponding statements relating to the method according to the invention with respect to the advantages which can be achieved by these embodiments.

In the system according to the invention there is preferably also provision that a trigger signal fed to at least one wheel unit as a result of the activation of the portable transmitter.

An advantageous development of the system according to the invention provides for the portable transmitter to be formed by a component of a vehicle locking system.

In particular in the context explained above, there is preferably also provision for the position determining means to evaluate the output signals of components of a vehicle locking system which are provided at the vehicle end.

Similarly to the method according to the invention, there is also provision in particularly preferred embodiments of the system according to the invention for the determination of the wheel positions of the monitored wheels to comprise the portable transmitter being activated from at least two different sides with respect to the vehicle.

Here, there is preferably also provision that the activation of the portable transmitter from a first side, with respect to the vehicle causes a trigger signal to be fed to the two wheel units which face the first side.

In all embodiments of the system according to the invention it is also possible to provide for the data which is transmitted to the central evaluation device in response to a trigger signal to comprise identification data of the wheel unit.

In specific embodiments of the system according to the invention it may be advantageous that said system determines at least the wheel position of the wheel at which a fault state has occurred after a fault state has been determined from data which has been transmitted to the central evaluation device by one or more wheel units.

BRIEF DESCRIPTION OF THE DRAWINGS

The invention will now be explained by way of example by means of preferred embodiments and with reference to the appended drawings, in which:

FIG. 1 shows a schematic block circuit diagram of a motor vehicle which has an embodiment of the system according to the invention; and FIG. 2 shows a flowchart which illustrates an embodiment of the method according to the invention.

DETAILED DESCRIPTION OF THE PREFERRED EMBODIMENTS

FIG. 1 shows a schematic block circuit diagram of a motor vehicle which has an embodiment of the system according to the invention. Here, the motor vehicle is designated in its entirety by 10. The motor vehicle 10 has four wheels R1, R2, R3, R4. Each of the wheels R1, R2, R3, R4 is assigned a wheel unit E1, E2, E3, E4 which can be arranged, for example, in the tire and/or in the region of the valve of the respective wheel R1, R2, R3, R4. The wheel position front left is referred to as FL, the wheel position front right is referred to as FR, the wheel position rear left is referred to as RL and the wheel position rear right is referred to as RR. The wheel units E1, E2, E3, E4 have suitable transmitting devices for transmitting data D1, D2, D3, D4 to the central evaluation device ECU by means of radio-frequency radio signals, for example. By means of this data D1, D2, D3, D4, the central evaluation device ECU can determine whether a fault state has occurred at a wheel R1, R2, R3, R4. The data D1, D2, D3, D4 is transmitted here in response to trigger signals TR1, TR2, TR3, TR4 which are transmitted to the respective wheel units E1, E2, E3, E4 by the central evaluation device ECU, preferably at regular intervals. The wheels R1, R2, R3, R4 are assigned to the respective wheel positions FL, FR, RL, RR in the embodiment illustrated in FIG. 1 by a portable transmitter 12, preferably the remote control means of a vehicle locking system PAS, being activated from two adjacent sides of the motor vehicle 10, that is to say from the front F and the right R or from the right R and rear R or from the rear R and left L or from the left L and front F. According to the illustration in FIG. 1, the portable transmitter 12 is firstly activated from the left side L of the motor vehicle 10 and then at the rear side R of the motor vehicle 10, as is indicated by the dashed representation. If the transmitter 12 is activated on the left side L of the motor vehicle 10, it transmits a trigger signal TR5 which is received by the wheel unit E1 and the wheel unit E4. In response to the reception of the trigger signal TR5, the wheel units E1 and E4 transmit data D1, D4 to the central evaluation device ECU which comprises at least identification information of the wheel units E1 and E4. The signal which is emitted by the portable transmitter 12 is also received by receivers (not illustrated in FIG. 1) of the vehicle locking system PAS, the receivers of the vehicle locking system PAS which are provided on the left side L receive the highest signal level. In this way, it is known that the portable transmitter 12 has been activated on the left side L. This information is stored together with the data D1 and D4 transmitted by the wheel units E1 and E4. The portable transmitter 12 is then activated on the rear side R of the motor vehicle 10. As a result, a trigger signal TR6 is fed to the wheel unit E4 and the wheel unit E3. The wheel units E3 and E4 then transmit data D3, D4 to the central evaluation device ECU, this data D3, D4 both comprising at least identification information, for example an individual identifier, of the wheel units E3 and E4. By means of the vehicle locking system PAS it is determined that the portable transmitter 12 has been activated on the rear side R of the vehicle 10. This information is also fed to the vehicle locking system PAS of the central evaluation device ECU. The following value pairs L-E1, L-E4, R-E4 and R-E3 are then available for determining the wheel positions FL, FR, RL, RR. From these value pairs it is then possible to conclude that the wheel unit E4 is located rear left RL, for which reason the wheel unit E3 must be located rear right RR, while the wheel unit E1 must be located front left FL. The wheel unit E2 must therefore be located front right FR.

FIG. 2 shows a flowchart which illustrates an embodiment of the method according to the invention, the references used in the following explanation referring to FIG. 1. In step S10, the portable transmitter 12 in the form of a remote control means of the vehicle locking system PAS is activated on a first side L of the motor vehicle 10. Then, in step S11 the position L of the remote control means 12 of the motor vehicle locking system PAS in relation to the vehicle is sensed by position determining means and transmitted to the central evaluation device ECU. Here, the position determining means can be formed, for example, by the motor vehicle locking system PAS or the central evaluation device ECU. In step S12, the wheel units E1 and E4 provided on the first side L of the motor vehicle 10 transmit identification data to the central evaluation device ECU by radio. Then, in step S13 the remote control means 12 of the motor vehicle locking system PAS is activated on the second side R of the motor vehicle 10 which adjoins the first side. In step S14, the position R of the remote control means 12 of the motor vehicle locking system PAS in relation to the vehicle 10 is sensed again by the position determining means and transmitted to the central evaluation device ECU. In step S15, the wheel units E3 and E4 provided on the second side R of the motor vehicle 10 transmit identification data to the central evaluation device ECU by radio. Finally, in step S16 the central evaluation device ECU determines the wheel positions FL, FR, RL, RR of the monitored wheels R1, R2, R3, R4, in the fashion explained by way of example in FIG. 1, from the identification data transmitted to it and from positions of the remote control means of the motor vehicle locking system PAS.

The features of the invention which are disclosed in the description above, in the drawings and in the claims will be essential for the implementation of the invention, either individually or in any desired combination.

What is claimed is:

1. A method for determining the wheel position of wheels of a motor vehicle, comprising:
    transmitting a trigger signal from a portable transmitter that is received at a motor vehicle such that position of the portable transmitter is sensed relative to the motor vehicle;
    based on receiving the trigger signal, automatically transmitting data from a wheel unit to a central evaluation device, for monitoring purposes, the wheel unit operably assigned to a respective wheel of the motor vehicle; and
    based on position of the portable transmitter relative to the motor vehicle and the transmitted data from the wheel unit, determining a wheel position of the wheels of the motor vehicle.

2. The method as claimed in claim 1, wherein the trigger signal is fed to at least one wheel unit by activating the portable transmitter.

3. The method as claimed in claim 1, wherein the portable transmitter is formed by a component of a vehicle locking system.

4. The method as claimed in claim 1, wherein the position of the portable transmitter with respect to the vehicle is sensed by evaluating output signals of components of a vehicle locking system which are provided at the vehicle end.

5. The method as claimed in claim 1, wherein determination of the wheel positions of the monitored wheels comprises the portable transmitter being activated from at least two different sides with respect to the vehicle.

6. The method as claimed in claim 5, wherein the activation of the portable transmitter from a first side with respect to the vehicle causes the trigger signal to be fed to the two wheel units which face the first side.

7. The method as claimed in claim 1, wherein the data which is transmitted to the central evaluation device in response to the trigger signal comprises identification data of the wheel unit.

8. The method as claimed in claim 1, wherein the trigger signal is transmitted after a fault state has been determined from data which has been transmitted to the central evaluation device by one or more wheel units.

9. The method as claimed in claim 1, wherein the tire pressure is monitored.

10. A system for determining a wheel position of wheels of motor vehicle, comprising:
    a portable transmitter operable to transmit a trigger signal such that the position of the portable transmitter is determined relative to the motor vehicle;
    a wheel unit operably assigned to a respective wheel of a motor vehicle, the wheel unit operably activated to transmit data to a central evaluation device of the motor vehicle in response to receiving the trigger signal, whereby the trigger signal activates the wheel unit when placed proximate the portable transmitter; and
    the central evaluation device operable to determine position of the wheel position of the wheels of the motor vehicle based on position of the portable transmitter relative to the motor vehicle and the transmitted data from the wheel unit.

11. The system as claimed in claim 10, wherein the trigger signal is fed to at least one wheel unit as a result of the activation of the portable transmitter.

12. The system as claimed in claim 10, wherein the portable transmitter is formed by a component of a vehicle locking system.

13. The system as claimed in claim 10, wherein the position determining means evaluate output signals of components of a vehicle locking system which are provided at the vehicle end.

14. The system as claimed in claim 10, wherein the determination of the wheel positions of the monitored wheels comprises the portable transmitter being activated from at least two different sides with respect to the vehicle.

15. The system as claimed in claim 14, wherein the activation of the portable transmitter from a first side, with respect to the vehicle causes the trigger signal to be fed to the two wheel units which face the first side.

16. The system as claimed in claim 10, wherein data which is transmitted to the central evaluation device in response to the trigger signal comprises identification data of the wheel unit.

17. The system as claimed in claim 10, wherein the trigger signal is transmitted to determine at least the wheel position of the wheel at which a fault state has occurred after a fault state has been determined from data which has been transmitted to the central evaluation device by one or more wheel units.

18. The system as claimed in claim 10, wherein the tire pressure is monitored.

19. The method of claim 1, further comprising:
    activating the portable transmitter at another position relative to the motor vehicle such that a different position is sensed relative to the motor vehicle;
    based on receiving the trigger signal at the different position, automatically transmitting data from respective wheel units proximate the portable transmitter to the central evaluation device, for monitoring purposes; and
    based on position of the portable transmitter relative to the motor vehicle and the transmitted data from the wheel unit, determining wheel positions of the wheel of the motor vehicle.

* * * * *